Oct. 28, 1969  L. S. JESPERSON  3,474,604
METHOD OF AND APPARATUS FOR HARVESTING HOP VINES
Filed Dec. 8, 1966  6 Sheets-Sheet 1
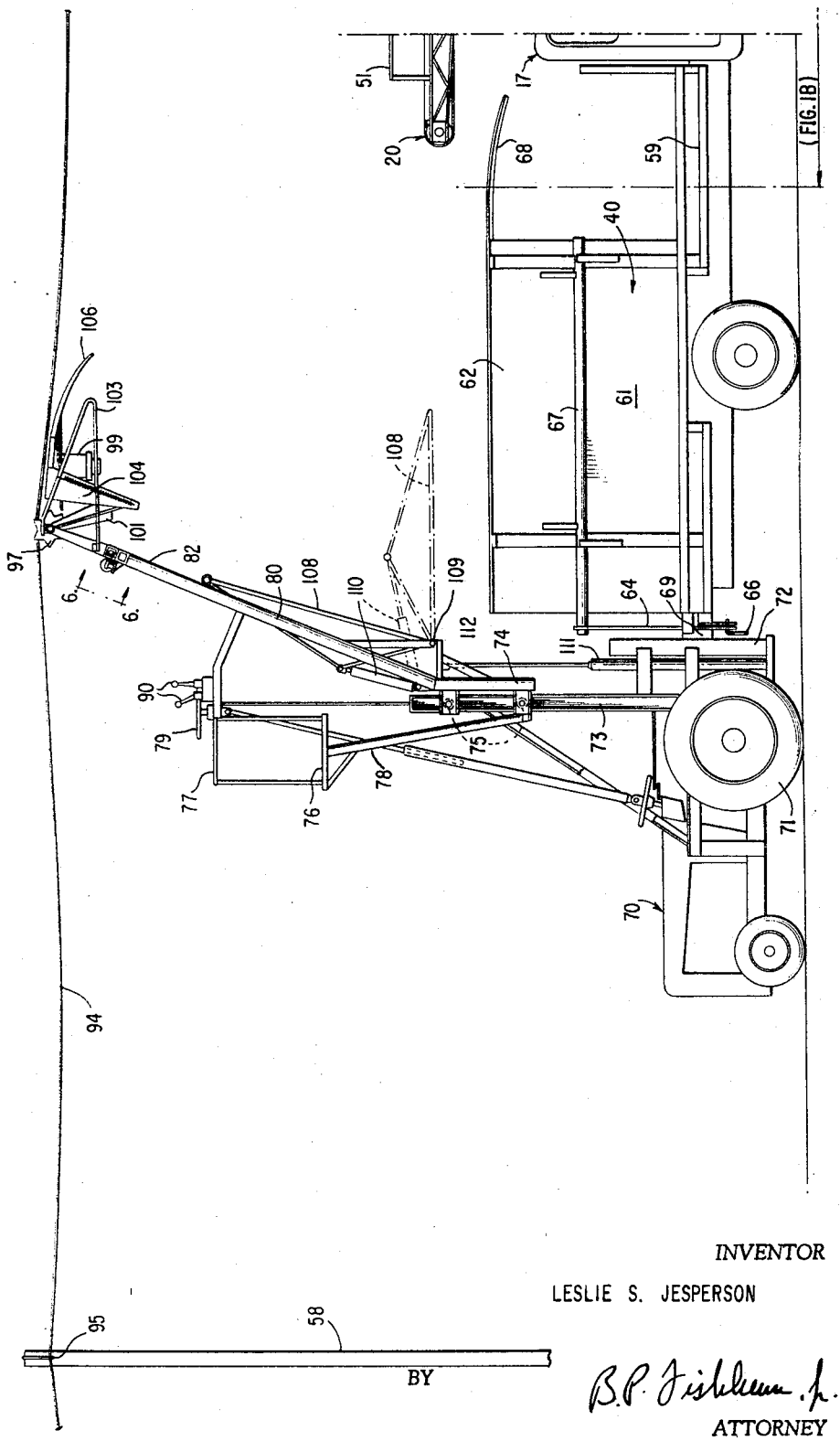
INVENTOR
LESLIE S. JESPERSON
BY
B.P. Fishburn Jr.
ATTORNEY

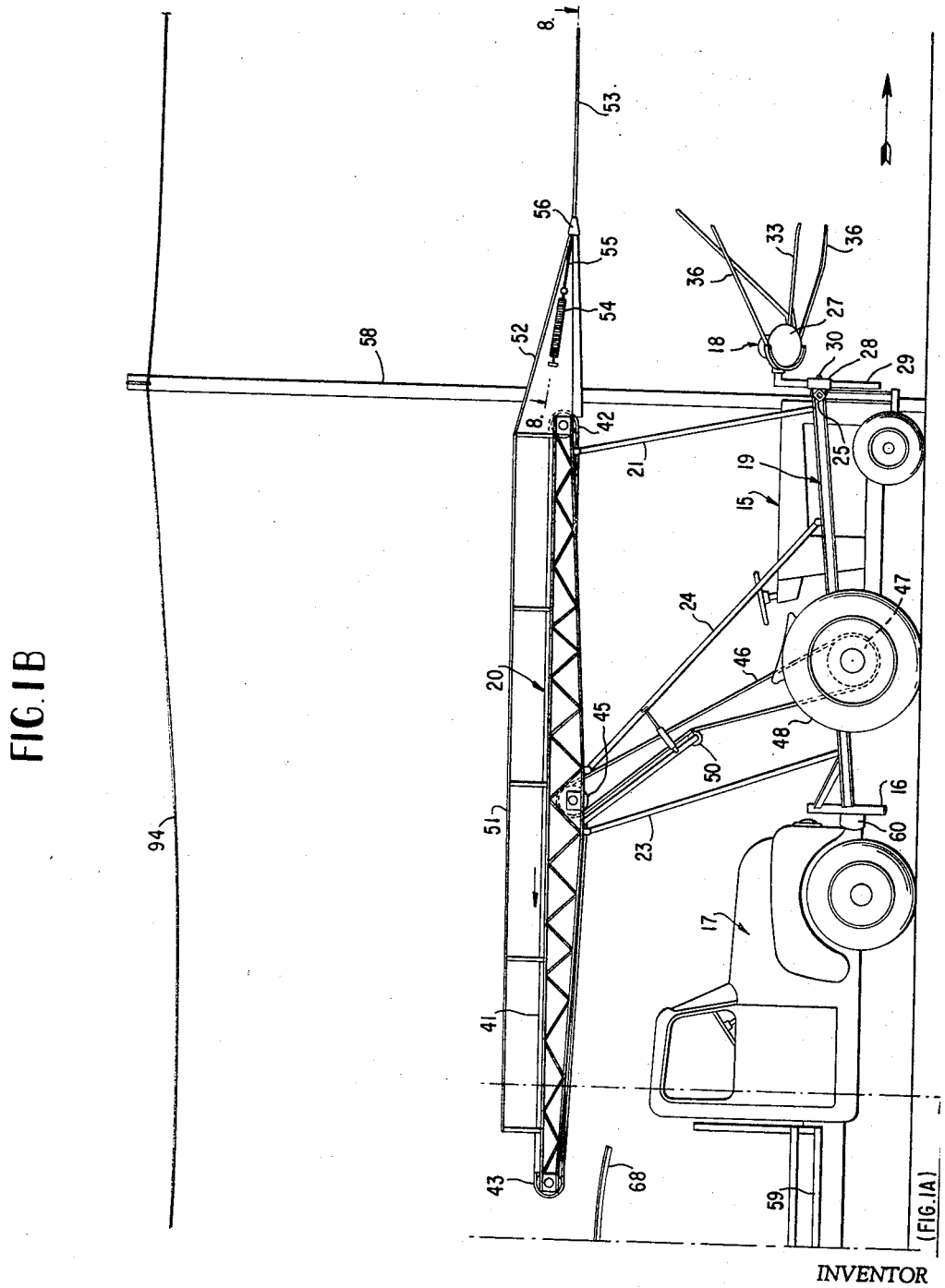

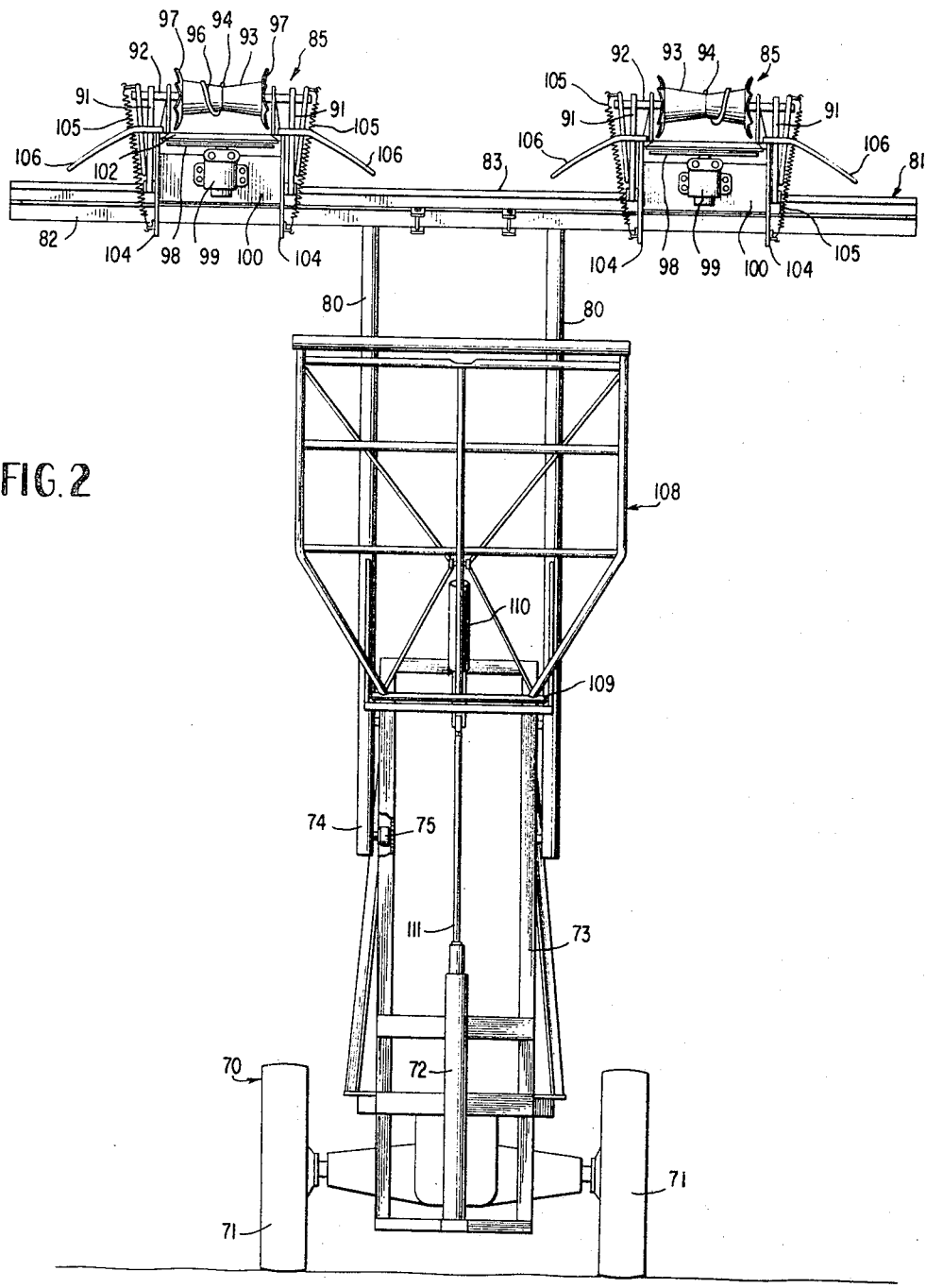

Oct. 28, 1969  L. S. JESPERSON  3,474,604
METHOD OF AND APPARATUS FOR HARVESTING HOP VINES
Filed Dec. 8, 1966  6 Sheets-Sheet 4

INVENTOR
LESLIE S. JESPERSON
BY
B. P. Fishburn Jr.
ATTORNEY

Oct. 28, 1969   L. S. JESPERSON   3,474,604
METHOD OF AND APPARATUS FOR HARVESTING HOP VINES
Filed Dec. 8, 1966   6 Sheets-Sheet 5

INVENTOR
LESLIE S. JESPERSON

BY

ATTORNEY

Oct. 28, 1969 L. S. JESPERSON 3,474,604
METHOD OF AND APPARATUS FOR HARVESTING HOP VINES
Filed Dec. 8, 1966 6 Sheets-Sheet 6

INVENTOR
LESLIE S. JESPERSON

BY B. P. Fishburn, Jr.
ATTORNEY

United States Patent Office 3,474,604
Patented Oct. 28, 1969

3,474,604
METHOD OF AND APPARATUS FOR HARVESTING HOP VINES
Leslie S. Jesperson, Sardis, British Columbia, Canada, assignor to Yakima Valley Equipment Co., Inc., Moxee, Wash., a corporation of Washington
Filed Dec. 8, 1966, Ser. No. 600,112
Int. Cl. A01d 57/00, 55/16; A01g 19/06
U.S. Cl. 56—25.4
13 Claims

ABSTRACT OF THE DISCLOSURE

A method and an apparatus for harvesting hop vines whose top ends are cutomarily supported on overhead wires while the lower ends of the vines are rooted in the ground. The hop vines grow in rows along which the overhead wires extend. The method involves severing the vines near and above their lower ends followed by elevating and rearward conveying of the severed lower ends while the apparatus caravan proceeds slowly along the rows. The severed lower ends of the vines are deposited in a bin or receptacle of the caravan and following this, the vines are again severed near their tops and the top severed portions then fall into a rearward portion of the bin or receptacle.

---

In the conventional harvesting of hop vines, a field crew of eight or nine men is customarily employed to operate the harvesting apparatus to complete the harvesting process. A truck having a bin or box for the harvested vines has a driver and two workers called "weavers" walk on opposite sides of the truck to manually deposit the lower severed ends of the vines in the forward portion of the bin. Two or three cutters walk ahead of the truck to cut manually the vines near their lower ends so that the weavers can pick them up as the caravan proceeds. The truck is followed by a tractor having a driver and equipped with some sort of overhead support for two more workers who cut the tops of the vines near and below the supporting wires. The severed top ends of the vines then drop into the truck bin. The conventional apparatus caravan therefore constitutes one truck and a following tractor and a crew of nine is involved, as stated.

According to the present invention, the total working crew is reduced to only three workers and the entire process is rendered much faster and much more efficient than the nine man operation. According to the invention, a leading tractor having a driver is equipped with power cutting means to sever hop vines near and above the ground along several rows and continuously as the caravan moves slowly forward. The front tractor carries an overhead conveyor which elevates the severed vines and conveys them rearwardly at a speed slightly in excess of the forward speed of the apparatus caravan. The overhead conveyor discharges the vines into the front region of a bin or box carried by the truck which closely follows the leading tractor and may, in fact, be coupled thereto. The truck has a driver who constitutes the second member of the work crew. The conveyor mechanism extends over the cab of the truck at a considerable elevation.

Immediately following the truck and preferably pushing the truck and the entire caravan is a second tractor which is preferably driven backwards in reverse gear for maximum traction. An overhead support for the third and final worker is mounted on the tractor above the traction wheels and remote controls are provided so that this third worker can steer and operate the pushing tractor. Power driven cutting means are also mounted upon the pushing tractor above the traction wheels and extending above and slightly forwardly of the worker support. The pushing tractor may also include a power driven device to pack the severed hop vines down in the truck bin under control of the rear operator or worker. The top severed ends of the vines are simply allowed to fall into the rear portion of the truck bin or box as the entire caravan proceeds down the rows. Both the leading low elevation cutting mechanism and the rear overhead cutting mechanism are adjustable laterally. Most of the harvesting operations are thus rendered automatic and substantially all of the customary manual labor is eliminated.

Other features and advantages of the invention will be apparent during the course of the following detailed description.

In the accompanying drawings forming a part of this application and in which like numerals are employed to designate like parts throughout the same, FIGURES 1A and 1B, taken together, constitute a side elevation of the complete hop vine harvesting apparatus employed in the practice of the method;

FIGURE 2 is an enlarged front elevation of the rearward or pushing tractor and the structure mounted thereon, parts omitted for clarity;

Figure 4:
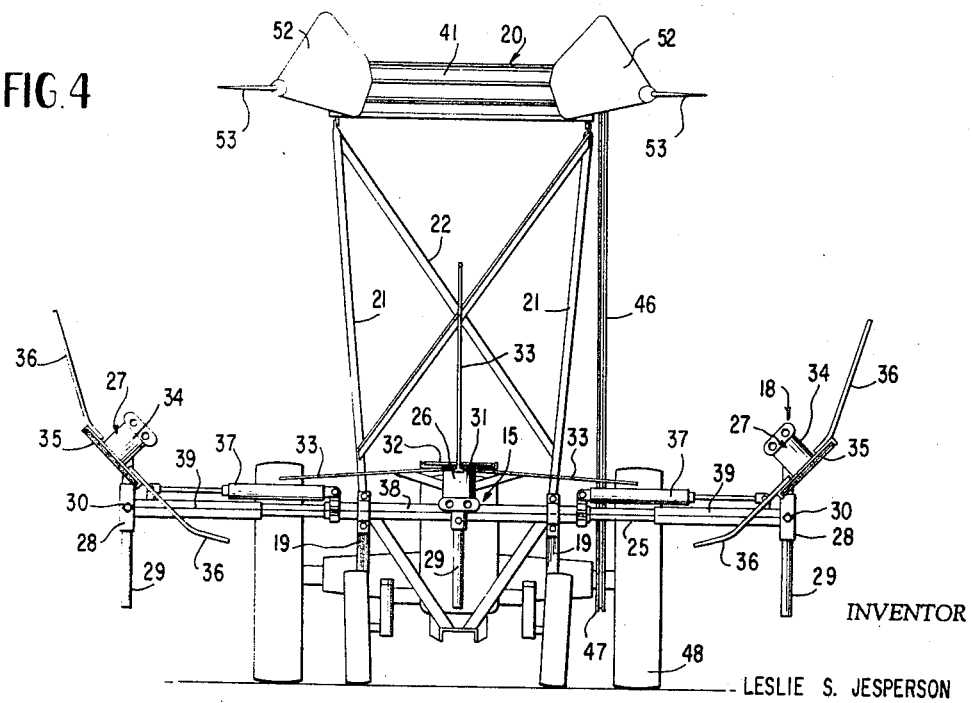
FIGURE 4 is a front elevational view of the leading component of the apparatus caravan including the low elevation cutters and the conveyor.

In the drawings, wherein for the purpose of illustration is shown a preferred embodiment of the invention, the apparatus utilized in the invention method comprises a forward tractor 15 having a driver, not shown, and having a rear end push bar 16 adapted to be engaged and pushed by a following truck 17 having a driver, not shown. The leading tractor 15 carries front end vertically and laterally adjustable cutting mechanism 18, to be described in some detail, and being shown in FIGURE 4. The forward tractor has a component mounting frame 19 upon which the several parts of the cutting mechanism 18 are mounted, as well as an overhead horizontal longitudinal vine conveyor 20. As shown, the conveyor 20 is supported by frame structure 21, 22, 23 and 24 connected with the mounting frame 19. Any preferred supporting framework may be used.

The cutting mechanism 18 has a transverse horizontal support bar 25 rigid with the frame 19, and center and side cutter units 26 and 27 are individually vertically adjustably mounted on the bar 25 by means of vertical sleeves 28, receiving vertically adjustable bars 29 of the several cutter units. The bars 29 are locked at the desired vertically adjusted positions by set screws 30 or by a similar means.

The center cutter unit 26 comprises preferably a hydraulic drive motor 31 which operates a horizontal center circular saw type cutter 32. The rear portion of the cutter 32 may have a guard structure which also supports divergent forwardly projecting feeler rods 33, preferably three in number and arranged as shown.

Each side cutter unit 27 comprises a similar hydraulic drive motor 34, driving side inclined saw type cutters 35 having a guard structure which supports forwardly divergent feelers 36. All of the feelers are preferably somewhat resilient. If preferred, electric motors may be employed instead of the hydraulic motors 31 and 34. Hydraulic motors are practical, however, because tractors are generally equipped with hydraulic systems for operating implements.

The side cutter units 27 are independently laterally adjustable by means of extensible and retractable horizontal cylinder-piston units 37 whose inner ends are connected wtih a center tube section 38 which supports the bar 25. The piston rods of the units 37 are connected with outer tube section 38 which supports the bar 25. The piston rods of the units 37 are connected with outer tube sections 39 which in turn carry the outer two sleeves 28. The tube sections 39 have telescoping engagement with the fixed bar 25. Therefore, when the units 37 are extended and retracted under control of the river on the tractor 15, the side cutter units 27 are bodily adjusted laterally to meet the needs of spacing of particular rows. The controls for the units 37 on the tractor 15 may be conventional and are omitted for simplicity.

Figure 7:
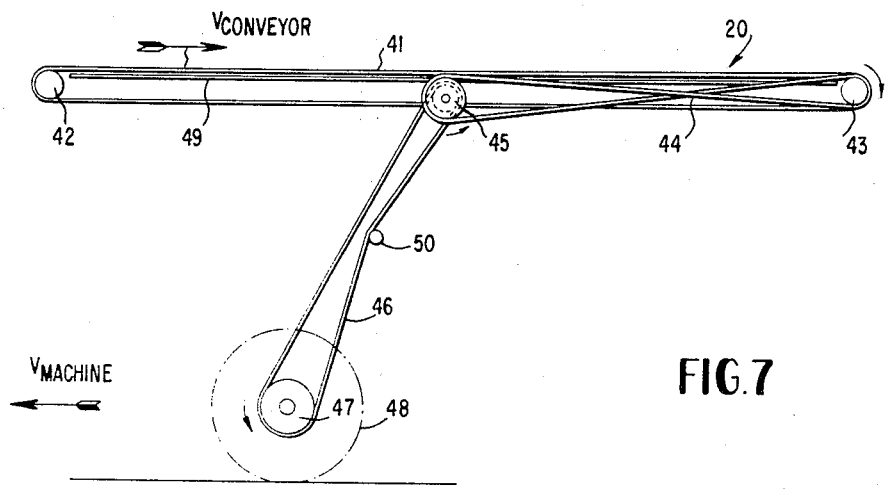
FIGURE 7 is a partly diagrammatic view of conveyor drive gearing.

The conveyor 20, as mentioned, is supported horizontally above the tractor 15 and its rear discharge end projects well over the cab of the truck 17 so that vines can be discharged into the truck bin or box 40 as shown in FIGURE 1A. The conveyor 20 comprises an endless flexible conveyor element 41, such as a slatted element or a belt. The endless conveyor element 41 engages conveyor end rolls 42 and 43, the roll 43 being engaged and driven by a crossed belt 44 driven by an intermediate pulley 45, driven by another belt 46, in turn driven by a pulley 47 on a rear wheel 48 of tractor 15. The driving arrangement of the conveyor is shown in FIGURE 7 diagrammatically and the arrangement is such that the upper run of the conveyor element 41 moves oppositely to the direction of movement of the caravan and at a slightly greater velocity than the forward movement of the caravan. The upper run of the element 41 may have a supporting apron 49 therebeneath and the belt 46 has a tightening means 50. Other forms of drive gearing may be employed if desired instead of the arrangement shown in FIGURE 7.

The conveyor 20 has low upstanding side walls 51 to prevent side spilling of the vine ends thereon and forwardly of the sides 51, the conveyor has forwardly projecting deflectors or shrouds 52 which are generally conical, in turn tipped at their forward ends with long slender needle-like feelers 53 which diverge forwardly and serve to gather in and guide the vine ends to the shrouds 52 and onto the conveyor after cutting near the ground by means of the cutters 32 and 35.

Figure 8:
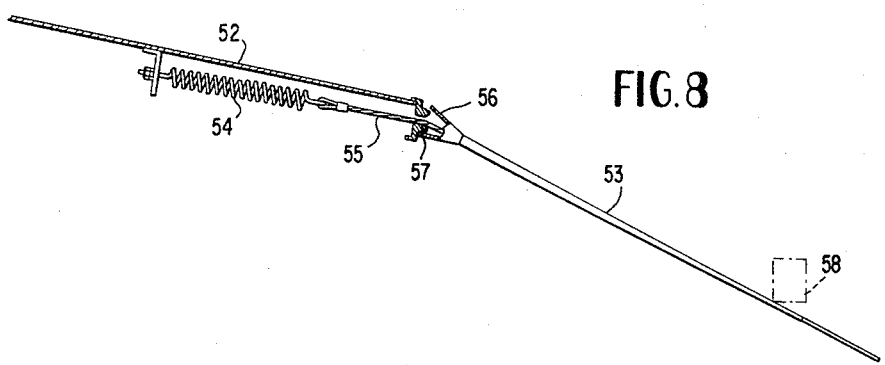
FIGURE 8 is an enlarged fragmentary section taken in line 8—8 of FIGURE 1B and showing the operation of a resilient feeler.

As shown in FIGURE 8, each feeler 53 is connected to the shroud 52 by a spring 54 and cable 55 and each feeler has a socket element 56 on its rear end forming a species of universal joint with a projection 57 on the forward end of the shroud. In the event that a feeler 53 strikes a solid object such as one of the poles 58 which support the overhead wires, the feeler can yield in any direction without damage thereto or to the remainder of the apparatus. When the tractor 15 advances forwardly, the top run of the conveyor element 41 is constantly driven in the rearward direction, as shown by the arrows to continually discharge the vines into the forward portion of the truck bin 40.

The truck 17 constitutes the intermediate vehicle of the apparatus caravan and the bed 59 of the truck is preferably without side walls immediately rearwardly of the cab, the bin 40 extending from the extreme rear end of the truck to a point spaced from the rear of the cab, as shown. The front bumper 60 of the truck 17 merely engages and pushes the bar 16 of tractor 15.

As shown, the truck bin or box 40 comprises fixed vertical side walls 61 and upper hinged side wall extensions 62 having depending operating levers 64. During use, the side wall extensions 62 may diverge outwardly and upwardly as in FIGURE 9 for increased capacity.

The levers 64 may however be swung downwardly to vertical positions and anchored to brackets 65 by locking pins 66, as when the truck is traveling on the highway and should not have its width exceeding maximum width regulations. The levers 64 are manually operated and they are also useful in helping to pack the vines into the truck bin. The extensions 62 are pivoted or hinged at 67 to the vertical walls 61, FIGURE 9. At their forward ends, the extensions 62 may carry forwardly extending vine guide bars 68 which assist in directing the vines from the conveyor 20 into the truck. The truck 17 preferably has a back pushing bumper 69 projecting rearwardly of the other mechanism so that the truck may be safely engaged by a pushing tractor 70 which preferably pushes the entire apparatus caravan along the hop rows.

As shown in the drawings, the pushing tractor 70 is a modified farm tractor which is preferably driven in reverse gear with its large traction wheels 71 rearmost. The tractor 70 is equipped with a sturdy pusher bar 72 which pushes the entire caravan, as stated, in the preferred mode of operation. The tractor further comprises a vertical guide rail structure 73 upon which is mounted a vertically movable carriage structure 74 having rail engaging rollers 75. The carriage structure 74 includes an elevated worker platform 76 having a protective rail 77 and secured to the carriage structure by a strut 78. The elevated worker on the platform 76 has a steering wheel 79 and other controls, not shown, for driving and steering the pushing tractor 70 remotely. The operator on the platform 76 is at a sufficient elevation to have a commanding view of the entire apparatus caravan. In this connection, horns or other audible signals may be utilized between the three operators on the vehicles to completely coordinate the functions of the invention. The elevated operator assumes a standing position on the platform 76 and faces forwardly.

Figure 5:
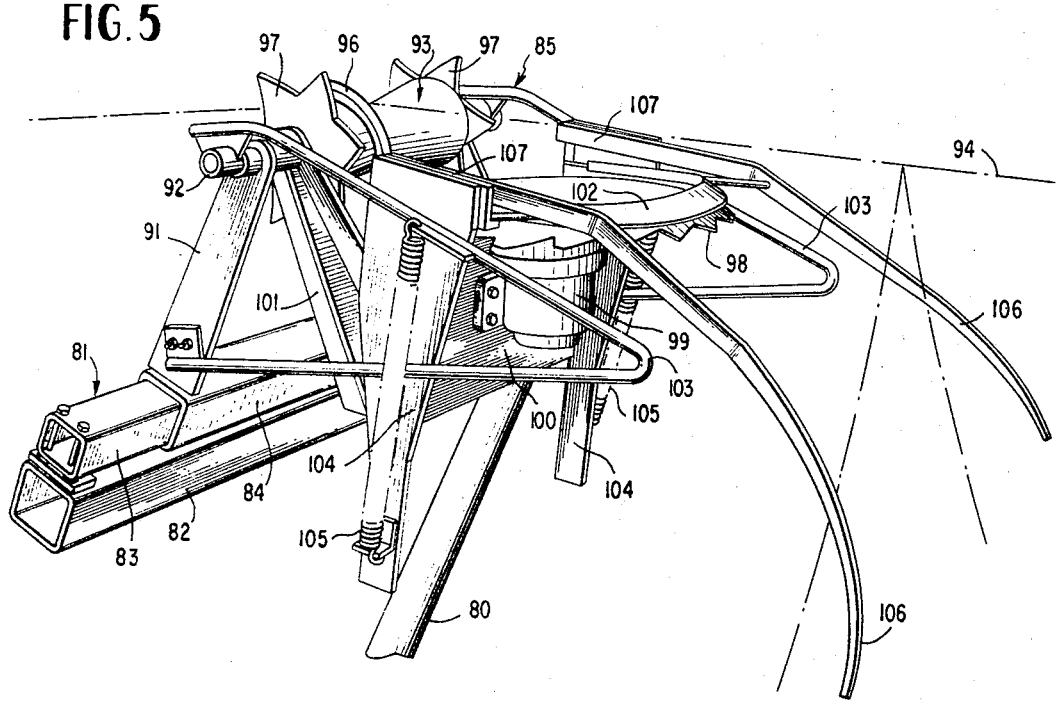
FIGURE 5 is a fragmentary perspective view showing one of the overhead cutting units and support means.
Figure 6:
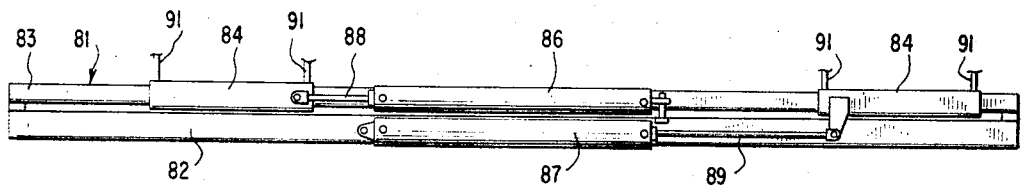
FIGURE 6 is a fragmentary rear elevational view taken stantially on line 6—6 of FIGURE 1A.

The carriage structure 74 additionally comprises upwardly extending and slightly forwardly inclined arms or booms 80 which are sturdy and suitably braced as depicted in the drawings. The tops of the arms 80 carry a transverse horizontal guide bar assembly 81 consisting of a lower relatively large rectangular bar 82 and an upper smaller cross section rectangular bar 83. As shown in FIGURE 6, the upper rectangular bar 83 serves as a support and guide for rectangular carriage tube sections 84, slidably and telescopically mounted thereon. As will be described, each carriage tube section 84 supports one of a pair of upper vine cutting assemblies or units 85, FIGURE 5 showing one of these units. The cutting units 85 may be raised and lowered with the carriage structure 74 and they are also adjustable laterally along the bar 83 by means of a pair of opposed extensible and retractable fluid pressure operated cylinder-piston units 86 and 87 mounted upon the bars 83 and 82, respectively, as shown in FIGURE 6. The extensible and retractable unit 86 has its piston rod 88 connected with the carriage tube section 84 to the left in FIGURE 6, while the piston rod 89 of the unit 87 is connected with the carriage tube section 84 to the right in FIGURE 6. The operator on the platform 76 has suitable hydraulic controls 90 of a conventional nature, by means of which the units 86 and 87 are individually controlled for adjusting the cutting unit 85 laterally on the bar assembly 81. This corresponds generally with the individual lateral adjustability of the previously-described cutter units 27 on the leading tractor 15.

Figure 3:
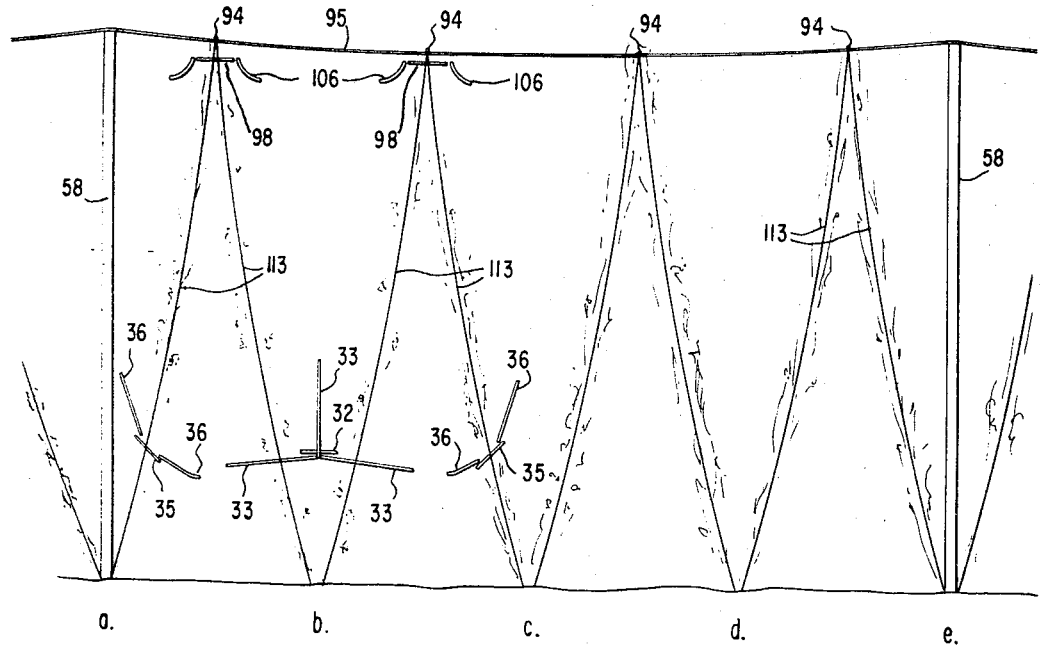
FIGURE 3 is a diagrammatic view showing the arrangement of the hop vines in the rows, their overhead supporting wires, and the cutting means for upper and lower regions of the vines.

Each upper cutting unit 85 comprises a pair of upstanding supporting arms 91 rigidly secured at their lower ends to the carriage tube sections 84. At their tops, the arms 91 support a transverse horizontal shaft 92 upon which is journaled a cone roller 93 which tapers toward its center from its opposite ends. Each cone roller 93 engages one of the longitudinal vine supporting wires 94 which extend along and are parallel to the rows of hop vines. At intervals along the wires 94, somewhat heavier transverse wires 95 support the wires 94 and the wires 95 are supported by the posts 58 which are spaced apart laterally at every fourth row of hop vines, as shown in FIGURE 3.

Each cone roller 93 is preferably provided with a spiral element 96 which tends to divert the engaged wire 94 inwardly toward the center of the cutter unit. The oposite ends of each roller 93 are equipped with starlike discs 97 adapted to engage the transverse supporting wires 95 and to lift the same safely over and rearwardly of the forwardly traveling cutting units. The rollers 93 are unpowered but are freely rotatable upon the shafts 92.

The upper cutting mechanism proper of each unit 85 consists preferably of a toothed circular cutting disc 98 which is preferably convex so that its teeth slant downwardly. The disc 98 is driven by a hydraulic motor 99 rigidly mounted upon a generally vertical support plate 100, secured to arms 101 whose upper ends are suspended pivotally from the shaft 92 between the roller 93 and the fixed arms 91. The upper side of the rotary cutter 98 is partially covered by an inclined guard 102, as shown.

Rigid forwardly extending V-shaped ramp frames 103 are secured to the fixed arms 91 and shaft 92 on the opposite sides of each cutter unit 95 and the inclined tops of these frames serve to lift and guide the transverse wires 95 upwardly toward the roller 93 as the apparatus progresses along the rows. The cutter 98, motor 99 and support plate 100, along with the arms 101, constitute a unit rockable about the axis of shaft 92. This unit also includes side vertical arms 104 suitably secured to the cutter guard structure and arranged just inwardly of the ramp frames 103. Retractile coil springs 105 interconnect the frames 103 near their midpoints with the arms 104 near their lower ends and these springs serve to hold the cutters 98 in a generally level attitude but allow forward and downward swinging or yielding of the cutter structure when required by an obstruction such as a sagging wire 95. To facilitate this action, a forwardly extending pair of feelers 106 which also diverge and curve downwardly are secured at their rear ends 107 to the tops of arms 104 on opposite sides of the cutter 98. When a cross wire 95 or the like engages the tops of the feelers 106, the cutter structure which is pivoted on the shaft 92 will swing downwardly somewhat, stretching the springs 105 and thereby allowing the cross wire to slide up the fixed inclined ramp elements 103 and engage the star discs 97 and be carried rearwardly over the roller 93 which all the while engages the longitudinal wire 94. It should be understood that the hop vines collectively are quite heavy and do cause the network of supporting wires to sag and therefore the described yielding and ramp means are necessary in the apparatus to assure the proper passage of the supporting wires and the proper cutting of the top portions of the vines near and below the wires and without cutting the wires.

The hydraulic motors 99 of the cutters are powered from the pushing tractor 70 which has a hydraulic system, and all conventional controls are on the elevated platform 76 where the single operator is positioned. The cutters 98 may be electrically driven, if preferred.

A further feature of the rear apparatus unit on the pushing tractor 70 is the provision of a vertically swingable vine packing frame 108, pivoted at 109 to the carriage structure 74 and adapted to swing vertically under the influence of a fluid pressure operated cylinder-piston unit 110, conventionally controlled from the platform 76. FIGURE 1A shows the packing frame 108 in the retracted inactive position in full lines. The broken line illustration shows the packing frame in the down or active position above the truck box where it may pack the vines therein. In addition to being vertically swingable, the packing frame moves vertically with the carriage structure 75. The entire carriage structure 74 and all of the components mounted thereon are raised and lowered by a vertical hydraulic cylinder-piston unit 111 on the pushing end of the tractor 70. The unit 111 is connected to a member 112 of the carriage structure 74. It may be observed in FIGURE 1A that the weight of the overhead apparatus is concentrated on the traction wheels 71 which results in better traction.

Operation

The operation of the apparatus in the practice of the method will be described with particular reference to diagrammatic FIGURE 3. This figure shows rows a, b, c, d and e of growing hop vines 113 whose upper ends are tied suitably to the overhead longitudinal supporting wires 94. The low elevation cutters 32 and 35 at the front of the tractor 15 are illustrated and the top cutters 98 on the pushing tractor 70 and their feelers are also illustrated. As indicated in FIGURE 3, the vehicle caravan straddles the row b in the illustration and after proper lateral adjustment of all of the cutters in the manner previously explained, the apparatus caravan proceeds along the row b under the pushing power of the tractor 70 and harvesting takes place in the rows a, b and c in the following manner.

As the caravan moves forwardly, the front low elevation cutters 32 and 35 sever the vines 113 in rows a, b and c relatively near the ground level. The feelers 33 of center cutter 32 urge both vines 113 of row b into the cutter 32 for severing. In a like manner, the two side cutters 35 sever the innermost vine only in rows a and c, leaving the next outermost vine unsevered and to be taken care of by the next pass of the apparatus, as when the apparatus straddles row d.

After this low elevation cutting of the vines, their tops are still secured to the wires 94 and they are now hanging freely from these wires. The hanging ends are gathered inwardly by the conveyor feelers 53 and shrouds 52 and the hanging ends move onto the rearwardly moving endless conveyor element 41 and are carried toward the truck bin 40 continuously as the caravan moves forwardly and at a speed slightly greater than the movement of the caravan. At the rear discharge end of the conveyor 20, the hanging ends of the vines may drop onto the forward portion of the truck bed and the elements 68 help to guide the vines onto the truck.

Immediately following the discharge of the low severed ends of the vines from the conveyor 20, the overhead cutters 98 begin their work of severing both vines 113 in the row b and a single vine in the rows a and c. The feelers 106 direct the vines into the cutters 98 and the cutters are adjuseted to cut the vines close to the wires 94 without contacting the wires. As previously explained, the feelers 106, ramp elements 103 and rollers 93 assure that the cross wires 95 will pass safely over the advancing cutting apparatus, as shown in FIGURE 1A. Also, the rollers 93 and their spiral elements 96 serve to center the particular wire 94 with the cutter 98.

Figure 9:
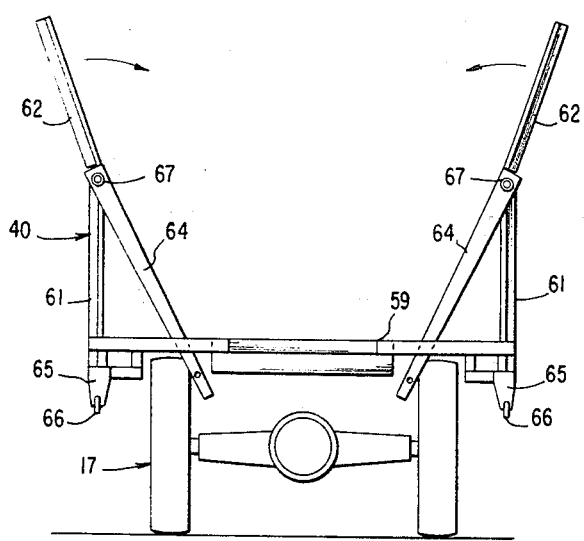
FIGURE 9 is a rear elevational view of the truck and bin structure constituting the intermediate vehicle of the caravan, parts omitted.

When the vines are thus severed, they will fall into the truck bin 40 on the rear portion of the truck and the arrangement of the diverging side wall portions 62, FIGURE 9, aids in the entry of the vines into the truck. The vine packer 108 may be utilized as required for packing the vines down. The cycle of operation is continuous as the caravan advances. The vines in three rows are severed near the ground and while hanging from the wires are conveyed rearwardly to the truck, followed by severing of the tops of the vines so that the entire vines will enter the truck. As should now be apparent, a great amount of manual labor is dispensed with, with an actual increase in harvesting efficiency. It is thought that the advantages of the invention will now be apparent to those skilled in the art without the necessity for any further description.

It is to be understood that the form of the invention herewith shown and described is to be taken as a preferred example of the same, and that various changes in the shape, size and arrangement of parts may be resorted to.

I claim:
1. Apparatus for harvesting hop vines growing in rows with their tops supported by overhead wires, comprising a leading wheeled unit having a leading low elevation power-operated vine cutting means thereon, an elevated generally level rearwardly moving conveyor structure on the leading wheeled unit extending somewhat rearwardly thereof, an intermediate wheeled unit following the leading unit and having a top opening bin near the rear end of the conveyor structure to receive vine parts discharged therefrom, and a trailing powered pushing wheeled unit immediately following the intermediate unit and including a high elevation power-operated vine cutting means located substantially above said bin and above the elevation of the conveyor structure and adapted to sever the tops of vines near and below said wires.

2. The invention as defined by claim 1, and a vertically movable carriage structure on the pushing wheeled unit carrying the high elevation cutting means and rendering the same vertically adjustable.

3. The invention as defined by claim 2, and an elevated worker platform on the carrying structure rearwardly of the high elevation cutting means.

4. The invention as defined by claim 2, wherein the low and high elevation cutting means each comprise a plurality of cutting units which are laterally adjustable to accommodate variations in the spacing of rows.

5. The invention as defined by claim 4, and divergent feeler means on each cutting unit for directing vines to the cutter of the unit.

6. The invention as defined by claim 4, wherein each cutter unit comprises a rotary toothed cutting disc.

7. The invention as defined by claim 1, and a guide roller means on the high elevation cutting means adapted to engage and support an overhead wire during movement of the apparatus along said rows.

8. In an apparatus for harvesting hop vines, a leading wheeled vehicle, a vertically and laterally adjustable vine cutting mens on the front of the leading vehicle to sever vines as the vehicle advances along rows, an overhead substantially horizontal rearwardly moving conveyor carried by the leading vehicle and having a rear discharge end which projects a substantial distance rearwardly of the leading vehicle, a following wheeled vehicle arranged closely behind the leading vehicle and having a vine receiving bin beneath and rearwardly of said discharge end of the conveyor, and a high elevation cutter means on said following vehicle located above the bin and conveyor.

9. The invention as defined by claim 8, and wherein the vine receiving bin comprises an open top bin having fixed side wall portions, vertically swingable side wall portions mounted upon the fixed side wall portions and adapted to diverge outwardly and upwardly from the tops of the fixed side wall portions, and levers connected with the swingable side wall portions so that the latter may be returned to a substantially vertical position when desired and locked in such position.

10. In a hop vine harvesting apparatus, a vehicular support to travel along a row of vines, at least a pair of verticlly and laterally adjustable power operated vine cutters on the front of the vehicular support, an elevated longitudinal substantially horizontal conveyor including a rearwardly moving conveyor element on the vehicular support and having a forward end above and rearwardly of said cutters and a rear discharge end substantially rearwardly of the cutters, and high elevation cutter means on the vehicular support located above said conveyor and said vehicular support including a collection bin below the high elevation cutter means.

11. The invention as defined by claim 10, and wherein said conveyor element is an endless flexible element, and gearing drivingly interconnecting the conveyor element with a wheel of said vehicular support.

12. The invention as defined by claim 10, and wherein said vine cutters are three in number including a center cutter and a pair of side cutters, and a retractable and extensible supporting device for each side cutter so that the same may be adjusted toward or away from the center cutter.

13. The invention as defined by claim 12, and wherein all of said cutters are circular rotary toothed cutters, the center cutter operating in a substantially horizontal plane and the side cutters operating in inclined planes.

References Cited
UNITED STATES PATENTS

| | | | |
|---|---|---|---|
| 2,648,942 | 8/1953 | Grant et al. | 56—56 X |
| 2,685,773 | 8/1954 | Davenhauer | 56—1 |
| 2,987,865 | 6/1961 | Sherman | 56—17 X |
| 3,025,653 | 3/1962 | Ackermann | 56—53 |
| 3,246,460 | 4/1966 | Patterson et al. | 56—235 |

LOUIS G. MANCENE, Primary Examiner

PASQUALE A. RAZZANO, Assistant Examiner

U.S. Cl. X.R.

56—19, 63, 238; 130—30